United States Patent [19]

Jepson et al.

[11] 3,807,225

[45] Apr. 30, 1974

[54] MEASUREMENT OF EDGE SHARPNESS

[75] Inventors: Peter Jepson; Eric P. Johnson; Alan Wyndham, all of Newcastle-on-Tyne, England

[73] Assignee: The Gas Council, London, England

[22] Filed: June 16, 1972

[21] Appl. No.: 263,675

[30] Foreign Application Priority Data
June 17, 1971 Great Britain............... 28525/71

[52] U.S. Cl. ............................................. 73/104
[51] Int. Cl. ......................................... G01n 19/08
[58] Field of Search........................... 73/104, 105

[56] References Cited
UNITED STATES PATENTS
2,691,887  10/1954  Rinker............................. 73/105
FOREIGN PATENTS OR APPLICATIONS
977,502  12/1964  Great Britain................... 73/104

Primary Examiner—Herbert Goldstein
Attorney, Agent, or Firm—Brisebois & Kruger

[57] ABSTRACT

A device for taking an impression of the orifice edge profile of an orifice plate so that the edge sharpness can be measured, comprises a support bar having clamps for rigidly fixing the bar to the orifice plate, the clamps preferably being adjustable along the length of the bar, and a rocker arm pivotally mounted between its ends on a carriage which is slidable along the bar and which can be locked in any desired position on the bar. The bar carries at one end a holder for a piece of lead foil and at its other end a micrometer head having its spindle projecting into engagement with a stop which is fixed on the carriage. A spring acting between the rocker arm and the carriage biases the spring into engagement with the stop and hence screw adjustment of the micrometer head causes the rocker arm to pivot. In use the arm is pivoted to bring the lead foil into contact with the orifice edge of the orifice plate to be tested, and further pivotal movement causes the edge the foil to a measured to a measured amount.

9 Claims, 3 Drawing Figures

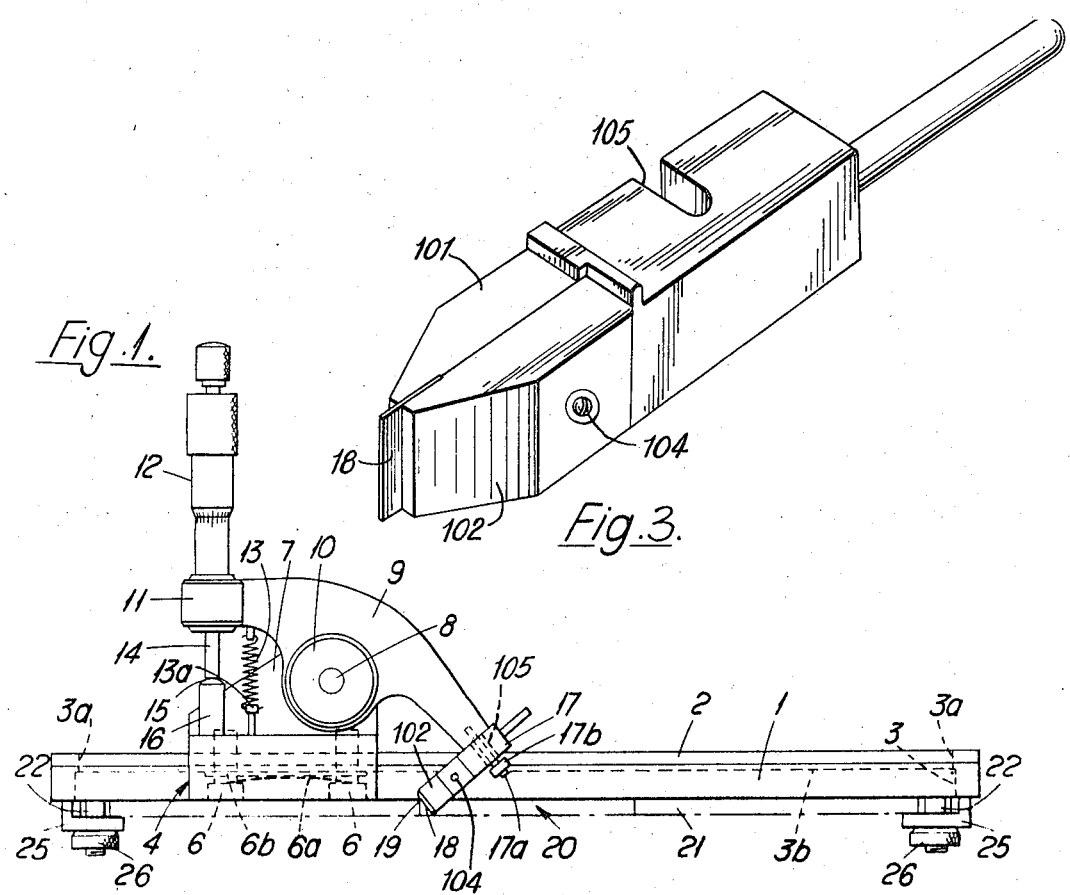
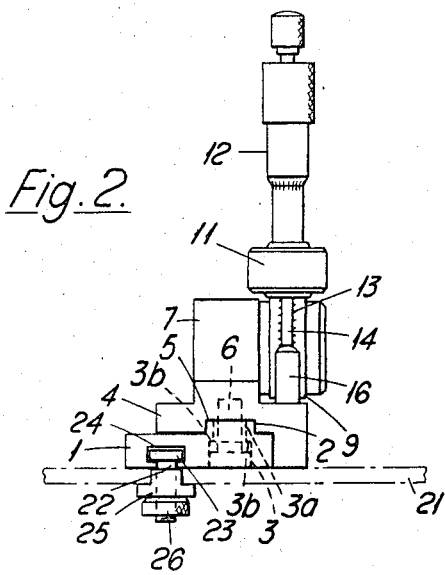

MEASUREMENT OF EDGE SHARPNESS

It is commonly necessary to measure the flow of fluid in pipes, and one of the recognised ways of doing this makes use of what are known as standard orifice plates. These are metal plates having circular orifices of set diameters and with sharp edges. In use a chosen plate is placed in the pipe perpendicular to the direction of flow and so that the flow passes through the orifice. If the flow is to be measured accurately it is important that the upstream edge of the orifice is sharp, and the British Standard recommends that the radius on the edge should not exceed 0.0004 times the diameter of the orifice, and that no burrs or wire edges should be present on the upstream edge. Lack of edge sharpness causes a less severe contraction of the jet caused by the fluid flowing through the orifice downstream of the plate, resulting in an under estimation of the flow. The presencce of burrs however, can have a much greater effect, causing either over or under estimation of the flow, and errors of up to 12.0 percent have been measured. Thus, it is clear that the condition of the orifice edge is extremely important if accurate flow measurement is to be obtained, and therefore frequent checks on the edge sharpness of standard orifice plates is desirable.

There are a number of techniques at present available for effecting such checks, namely the lead foil technique, the casting technique, the optical technique, and the stylus technique. However, none of these fulfill all of the following main requirements of a device for use in measuring edge sharpness:

a. it must be capable of providing for measurement of edge radii down to 0.0002 inches, and hence, if the British Standard mentioned above is followed, it must be able to be used with plates having an orifice diameter as small as 0.5 inch;

b. it should give a true representation of the edge profile so that burrs can be identified;

c. it must be simple to use so that measurements can be taken quickly and accurately; and d. it should be relatively inexpensive and robust.

The optical technique does not give very accurate representations of the edge form and the stylus technique gives results which vary with the diameter of the stylus. Also, both of these techniques require expensive and delicate equipment which makes them unsuitable for measurements to be carried out on site as is commonly necessary in the Gas industry. The casting technique is extremely laborious, taking up to 10 hours to complete a check on an orifice plate.

The lead foil technique consists of pressing the edge of a piece of lead foil against the orifice edge so that an impression of the edge is produced in the lead foil. The resulting impression is then greatly magnified, for example 200 times, so that the condition of the edge can be examined and its radius measured. The apparatus at present used for carrying out this technique consists of a support which is held by hand pressure on the orifice plate to be checked, and which carries a guide through which a rod carrying the lead foil at one end is pushed in a straight line to present the foil to the orifice edge. However, the standard of results obtained with this apparatus has been found to vary enormously, and this has been attributed to small movements of the device relative to the plate when the impression is taken. These movements are probably due to finite clearances between the rod and its guide when the foil is presented to the edge, and to variations in hand pressure while holding the device on the orifice plate. For repeatedly good and reproducable results to be obtained with this apparatus, a skilled operator is necessary.

The aim of the present invention is to provide a device which enables the lead foil technique to be used in measuring the sharpness of an edge and which does not need a skilled operator in order for repeatedly accurate and reproducable results to be obtained.

According to the present invention therefore, a device for taking an impression of the edge profile of an orifice plate so that the edge sharpness can be measured, comprises a support bar having clamps for rigidly fixing the bar to an orifice plate, and an arm which is pivotally mounted between its ends with respect to the support bar and which carries at one end a holder for a piece of lead foil and has at the other end screw threaded adjustment means by which the arm can be rocked so that, in use, the lead foil is brought into contact with the edge of the orifice plate and is subsequently moved further to cause the edge to indent the foil to a measured amount.

Relative movements between the device and the orifice plate when taking an edge impression are avoided by the rigid clamping of the device to the plate, and errors which arose with the conventional lead foil device due to the push-pull nature of the foil holder rod and friction in the guide are avoided in the present device since a pivotal motion is used to present the foil to the edge, this motion being obtained by a screwing action applied to the screw adjustment means.

Preferably, the arm is pivotally mounted on a carriage which is slideable along the bar so that its position can be adjusted to accomodate orifices of different diameters, there being means for locking the carriage in position as desired on the bar. Preferably the arm is pivotally mounted by means of a precision roller bearing.

Preferably the screw adjustment means comprises a micrometer head which is attached to the end of the arm and which has its spindle projecting so as to engage a stop which is fixed relative to the pivot for the arm. Preferably the upper surface of the stop which is engaged by the spindle is hemispherical, and the arm is spring-loaded to urge the spindle into permanent engagement with the stop. In the preferred arrangement the stop is mounted on the carriage which carries the arm, and the spring-loading is provided by a tension spring which is connected between the carriage and the arm adjacent the end carrying the micrometer head.

In use, once the device has been attached to the orifice plate and the carriage and micrometer head adjusted so that the piece of lead foil carried by the holder just contacts the orifice edge, further screwing of the micrometer head further extends the spindle against the stop so that the arm is rocked about its pivot and the foil is forced onto the edge to produce an impression to a desired depth. The depth of impression is a fixed ratio of the extension of the spindle and can be accurately controlled and measured by the micrometer head. For example, a piece of lead foil 0.004 inch thick may be used and an impression having a depth of 0.006 inch produced. Measurements of the edge sharpness are then obtained by treating the impressed foil in the same way as described earlier.

The angle at which the foil is applied to the orifice edge is dependent upon the attitude of the foil holder on the end of the arm. Preferably the foil holder is mounted on the arm so that its attitude with respect to the arm may be adjusted in order to vary the angle of application of the foil to the orifice edge, although in most measurements the angle used is 45°.

By arranging that the clamps are adjustable in position along the length of the bar, the device may be used with orifice plates having different outer diameters. For example, the clamps may be retained in an undercut groove extending along the length of the undersurface of the bar, the clamps becoming locked with respect to the bar when they are tightened to clamp the bar and the orifice plate together.

An example of a device in accordance with the present invention will now be described with reference to the accompanying drawings in which:

FIG. 1 is a side elevation of the device;
FIG. 2 is an end elevation of the device;
FIG. 3 is a perspective view of the foil holder alone.

The device comprises a steel clamping bar 1 having a rectangular sectioned projection 2 extending along the length of its upper surface, and a groove 3 extending in its lower surface below the projection 2. A slot 3a in the upper surface of the projection 2 opens into the groove 3 so that shoulders 3b are formed. A carriage 4 is mounted on the bar 1 so that it is slidable along the length of the bar, the projection 2 fitting in a correspondingly shaped groove 5 in the undersurface of the carriage 4 and acting as a guide rail for the carriage. The carriage 4 is held in any desired position along the bar 1 by means of a pair of locking screws 6 which extend from the groove 3 through the slot 3a and are screwed into the carriage 4 at the base of the groove 5. A strong clamping spring 6a, acting between the heads of the screws 6 and a plate 6b which bears against the shoulders 3b, draws the carriage 4 against the bar 1 to lock the two frictionally together.

A perpendicularly projecting lug 7 extends along the carriage 4 longitudinally with respect to the clamping bar 1, and a stub axle 8 projects laterally from one side of the lug 7. A rocker arm 9 is pivotally mounted on the stub axle 8 by means of a precision roller bearing 10, so that the arm 9 rocks in a plane which is beyond one edge of the bar 1. The two ends of the rocker arm 9 extend in directions which form an included angle about the axle 8 of substantially 135°. One end of the rocker arm 9 carries a bracket 11, within which is fixed a micrometer head 12 which extends in the plane of the rocker arm. A coiled tension spring 13, acting between an adjustable screw 13a (for adjusting the spring tension) on the carriage 4 and the end of the rocker arm 9 adjacent the bracket 11, biases the rocker arm 9 in an anticlockwise direction about the axle 8, so that the spindle 14 of the micrometer head 12 engages a hemispherical surface 15 on a stop pin 16 which is fixed on the carriage 4. At its other end, i.e. remote from the bracket 11, the rocker arm 9 carries a lead foil holder 17 of a conventional type such, for example, as the one incorporated in the device developed and used by F. Herning in the experiments described in his German paper entitled "Investigations on the Problem of Bluntness of the Edge of Standard and Segment Orifices" reported in Brennstoff-Warme-Kraft 1962 14 (3) 119 to 126, in which a thin strip of lead foil is clamped between a pair of plate-like jaws 101, 102 which are screwed together by the screw 104 so that an edge 18 of the lead foil strip projects beyond one end of the holder 17. The holder is mounted on a screw-threaded stud 17a projecting from the end of the arm 9 through a slot 105 in the holder and is clamped to the arm by a nut 17b screwed onto the stud 17a. The holder 17 extends at right angles to the end of the arm 9 and in the plane of the arm, so that when the other end of the arm is parallel to the clamping bar 1, the holder 17 extends at 45° to the direction of the clamping bar 1. This means that, in use, the edge 18 of the lead foil held by the holder 17 is presented at an angle of 45° to the edge 19 of the orifice 20 in an orifice plate 21 (see dotted lines in FIG. 1) to which the device is clamped.

The clamping of the device to an orifice plate is effected by a pair of screw clamps each of which has a bolt 22 with a head 23 by which it is slidably retained in a T-shaped groove 24 extending along the undersurface of the bar 1. The shank of each bolt 22 projects downwards out of the groove 24 and extends through an opening in a clamping plate 25 before co-operating with a nut 26. In use, the bar is placed across the top surface of the orifice plate to be tested, and the screw clamps are moved towards each other until each clamping plate 25 slides underneath the orifice plate 21. The nuts 26 are then tightened which causes the clamping plates 25 to force the orifice plate 21 against the undersurface of the bar 1, and the bolt heads 23 to engage frictionally surfaces of the groove 24, so that the screw clamps, the orifice plate 21, and the bar 1 are held rigidly with respect to each other. Having clamped the device on an orifice plate 21 in this manner, the operation of the device to obtain an accurate impression of the orifice edge at a particular position in the edge 18 of a piece of lead foil is as described earlier. Obviously, the process may be repeated as often as desired to determine the sharpness of the orifice at a plurality of different positions.

We claim:

1. A device for taking an impression of the orifice edge profile of an orifice plate so that the sharpness of said orifice edge can be measured, said device including a support bar, clamps adapted for rigid fixing of said support bar to an orifice plate which is to be tested, a rocker arm having first and second ends, means mounting said rocker arm between the said first and second ends for pivotal movement relative to said support bar, a holder for a piece of lead foil, means mounting said holder at said first end of said rocker arm, and screw threaded adjustment means mounted at said second end of said rocker arm for pivoting said rocker arm whereby, in use, said rocker arm is pivoted relative to said orifice plate to bring the lead foil carried by said holder into contact with the orifice edge of said orifice plate to cause said orifice edge to indent said lead foil.

2. A device according to claim 1, including a carriage, means mounting said carriage on said support bar for sliding movement thereon whereby its position relative to said support bar can be adjusted, and means for locking said carriage in position on said support bar, said means pivotally mounting said rocker arm being fixed on said carriage.

3. A device according to claim 2, wherein said means pivotally mounting said rocker arm includes a precision roller bearing.

4. A device according to claim 2, wherein said screw-threaded adjustment means comprises a micrometer head having a spindle, and means attaching said micrometer head to said second end of said rocker arm whereby said spindle is movable relative to said rocker arm in response to screw adjustment of said micrometer head, and said device includes a stop mounted fixedly on said carriage, and a tension spring connected between said carriage and said second end of said rocker arm whereby said spindle is biased into engagement with said stop.

5. A device according to claim 1, wherein said screw threaded adjustment means comprises a micrometer head having a spindle, and means attaching said micrometer head to said second end of said rocker arm whereby said spindle is movable relative to said rocker arm in response to screw adjustment of said micrometer head, and said device includes a stop mounted fixedly with respect to said means pivotally mounting said rocker arm, said spindle projecting to engage said stop.

6. A device according to claim 5, wherein said stop has a hemispherical surface which is engaged by said spindle.

7. A device according to claim 5, including spring means adapted to bias said spindle into engagement with said stop.

8. A device according to claim 1, wherein said clamps are adjustable in position along the length of said support bar.

9. A device according to claim 8 wherein said support bar is provided with an undercut groove extending along the length of the undersurface of said support bar, and said clamps are each provided with means for slidably retaining said clamp in said groove, and screw means by which, in use, said support bar, said orifice plate, and said clamp can be frictionally locked together.

* * * * *